United States Patent
Matsuoka et al.

(10) Patent No.: US 8,311,314 B2
(45) Date of Patent: Nov. 13, 2012

(54) PATTERN MEASURING METHOD AND PATTERN MEASURING DEVICE

(75) Inventors: Ryoichi Matsuoka, Yotsukaido (JP); Akiyuki Sugiyama, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 933 days.

(21) Appl. No.: 12/392,533

(22) Filed: Feb. 25, 2009

(65) Prior Publication Data

US 2009/0232385 A1 Sep. 17, 2009

(30) Foreign Application Priority Data

Mar. 14, 2008 (JP) .................. 2008-065072

(51) Int. Cl.
*G06K 9/00* (2006.01)
(52) U.S. Cl. ...................................................... 382/145
(58) Field of Classification Search ................... 382/145
See application file for complete search history.

(56) References Cited

U.S. PATENT DOCUMENTS

| | | | |
|---|---|---|---|
| 5,955,227 A * | 9/1999 | Tsujita et al. ................... | 430/30 |
| 2006/0045326 A1 | 3/2006 | Toyoda et al. | |
| 2008/0130982 A1* | 6/2008 | Kitamura et al. ............. | 382/144 |

FOREIGN PATENT DOCUMENTS

| | | |
|---|---|---|
| JP | 2006-066478 | 3/2006 |
| WO | WO 2007/094439 A1 | 8/2007 |

* cited by examiner

*Primary Examiner* — Bhavesh Mehta
*Assistant Examiner* — Nirav G Patel
(74) *Attorney, Agent, or Firm* — McDermott Will & Emery LLP

(57) ABSTRACT

An object of the present invention is to provide a sample measuring method and a sample measuring device suitable for evaluation of inclination of a pattern edge. To achieve the object, a method and a device for forming a plurality of contours of a pattern edge and evaluating the dimension between the contours are proposed below. Forming a plurality of contours allows evaluation of the degree of inclination of an edge portion of a pattern. Further, displaying evaluation values indicative of the degree of the inclination of the edge portion in an in-plane distribution form makes identifying the cause of taper formation easier.

9 Claims, 14 Drawing Sheets

FIG. 14

| Pattern No. | Adj Pattern No. | Distance (nm) | Taper (nm) | |
|---|---|---|---|---|
| 53 | 126 | 125 | 0.3 | |
| 54 | 127 | 125 | 0.1 | |
| 55 | 128 | 125 | 0.2 | |
| 56 | 129 | 90 | 1.8 | |
| 57 | 130 | 90 | 2.0 | |
| 58 | 131 | 125 | 0.1 | |
| | | | | |

PATTERN MEASURING METHOD AND PATTERN MEASURING DEVICE

BACKGROUND OF THE INVENTION

1. Field of the Invention

The present invention relates to a method for measuring a pattern formed on a sample and a device for measuring the pattern, and particularly to a method and device for extracting a contour from a pattern edge in an image acquired with a scanning electron microscope or other device.

2. Description of the Related Art

In semiconductor manufacturing processes, a scanning electron microscope (hereinafter sometimes simply referred to as an SEM) or other charged particle beam device is used to measure a line width of a semiconductor device and evaluate the quality thereof. In particular, an SEM for measuring a line width of a line pattern and the diameter of a hole of a hole pattern of a semiconductor device is called a CD-SEM (Critical Dimension SEM).

Conventionally, CD-SEM-based measurement has been used to obtain one-dimensional measurement results, which are pattern dimensions, but two-dimensional geometries have been becoming an important evaluation item as well as one-dimensional dimensions in recent years.

To evaluate a two-dimensional geometry of a pattern, it is necessary to accurately identify an edge of the pattern. An edge portion in an SEM image, however, has a certain width and hence does not suit detailed geometry evaluation. To solve the problem, JP Patent Publication (Kokai) No. 2006-66478 (corresponding US Patent Application No. 2006/0045326) describes a technology for extracting a contour from a pattern edge in an SEM image. JP Patent Publication (Kokai) No. 2006-66478 (corresponding US Patent Application No. 2006/0045326) describes a technology for extracting a contour based on information on the change in brightness of a white band of a pattern edge.

Further, WO 2007/094439 describes a technology for redetermining a once-determined contour with higher precision, in which an SEM's partial scan direction is determined based on the determined contour and then a contour is extracted based on new brightness change information obtained based on the partial scan.

According to the descriptions in JP Patent Publication (Kokai) No. 2006-66478 (corresponding US Patent Application No. 2006/0045326) and WO 2007/094439, two-dimensional geometry evaluation can be carried out based on an accurately extracted contour of a pattern, but they do not describe evaluation of inclination of an edge portion of a pattern. For example, a photomask, which is one of the objects measured with an SEM, has a light-blocking pattern formed on a quartz substrate, the light-blocking pattern formed of a chromium film and corresponding to a circuit design pattern. A thus formed photomask is used in a semiconductor light-exposure device to transfer the design pattern onto a wafer in a manner similar to how a negative photographic film works.

A light-blocking pattern on a photomask tends to decrease in thickness as semiconductor devices have been miniaturized in recent years, but still has a certain thickness. When an edge portion of a light-blocking pattern having a certain thickness is inclined, the result of light exposure differs from that obtained from a vertical edge portion in some cases.

In particular, when an edge is tapered, the light from an optical exposure device is probably incident obliquely, possibly resulting in a smaller post-exposure pattern than expected. Evaluation of inclination of an edge portion can therefore be important in photomask geometry evaluation. Evaluation of the geometry of an edge portion is probably considered important in evaluating the quality of a pattern formed on a wafer as well.

A description will be made of a sample measuring method and a sample measuring device suitable for evaluation of inclination of a pattern edge.

SUMMARY OF THE INVENTION

To achieve the above object, a method and a device for forming a plurality of contours of a pattern edge are proposed below.

Forming a plurality of contours allows evaluation of the degree of inclination of an edge portion of a pattern.

BRIEF DESCRIPTION OF THE DRAWINGS

FIG. 14 explains an example of displaying inter-contour measurement results and dimensions between adjacent patterns all at once in a tabulated form.

DESCRIPTION OF THE PREFERRED EMBODIMENT

A method for forming a plurality of contours and a device and a system for carrying out the method will be described below with reference to the drawings.

Figure 1:
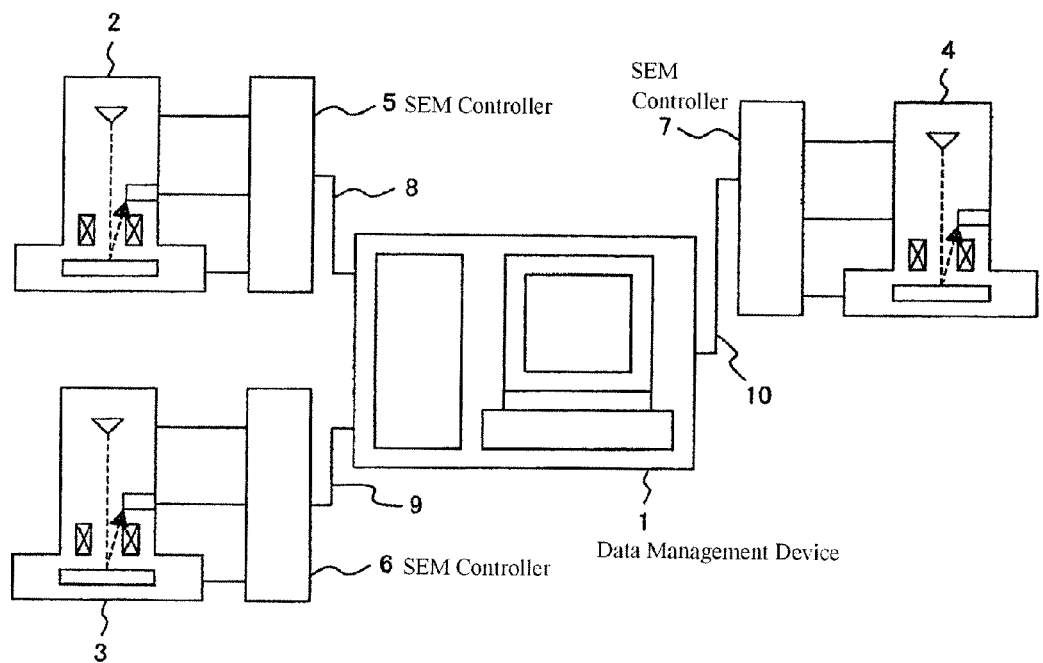
FIG. 1 explains an example of a system for extracting a contour from a pattern in a scanning electron microscope image.

FIG. 1 explains an example of a system for extracting a contour from a pattern in a scanning electron microscope image (hereinafter sometimes referred to as an SEM image). The following description will be made of a case where a scanning electron microscope is used as an aspect of a charged particle beam device, which is not limited thereto. For example, a focused ion beam (FIB) device, which scans a sample with an ion beam to form an image, may be used as the charged particle beam device. However, since a significantly high magnification is required to selectively scan an edge portion of a pattern that has been increasingly miniaturized, an SEM, which in general excels an FIB device in resolution, is desirably used.

FIG. 1 shows an example in which a data management device 1, which is a heart of the system, is connected to a plurality of SEMs. The SEMs 2, 3, and 4 are connected to controllers 5, 6, and 7, respectively, which control the SEMs. In each of the SEMs, an electron beam emitted from an electron source is focused through a plurality of lenses, and the focused electron beam scans a sample in a one-dimensional or two-dimensional manner under the control of a scan deflector.

Secondary electrons (SEs) or backscattered electrons (BSEs) emitted from the sample in response to the electron beam scan are detected by a detector and stored in a frame memory or other storage media in synchronization with the scanning performed by the scan deflector.

The scan deflector allows scanning within an arbitrarily size, at an arbitrary position, and in an arbitrary direction, which then allows image forming scanning and selective edge scanning, which will be described later.

The control described above and other operations are performed in the SEM controllers 5, 6, and 7, and images and signals produced by electron beam scanning are sent to the data management device 1 through communication lines 8, 9, and 10. While the present embodiment is described with reference to a case where the controllers for controlling the SEMs are provided separately from the data management device, which performs measurement based on the signals produced in the SEMs, but the present embodiment is not necessarily configured this way. The data management device may perform both the device control and the measurement, or each of the controllers may perform both the SEM control and the measurement.

The data management device or each of the controllers (hereinafter sometimes referred to as an image processing device) stores a program for performing the measurement, and the measurement is performed in accordance with the program. Further, a design data management device (the data management device or the controllers) stores design data on a photomask (hereinafter sometimes simply referred to as a mask) and a wafer used in semiconductor manufacturing processes. The design data are expressed in a GDS (Graphic Data System) format or an OASIS (Open Artwork System Interchange Standard) format and stored in a predetermined form. The format of design data is not limited to a specific one as long as the software for displaying design data can display design data expressed in the format and handle the design data as graphic data.

Figure 2:
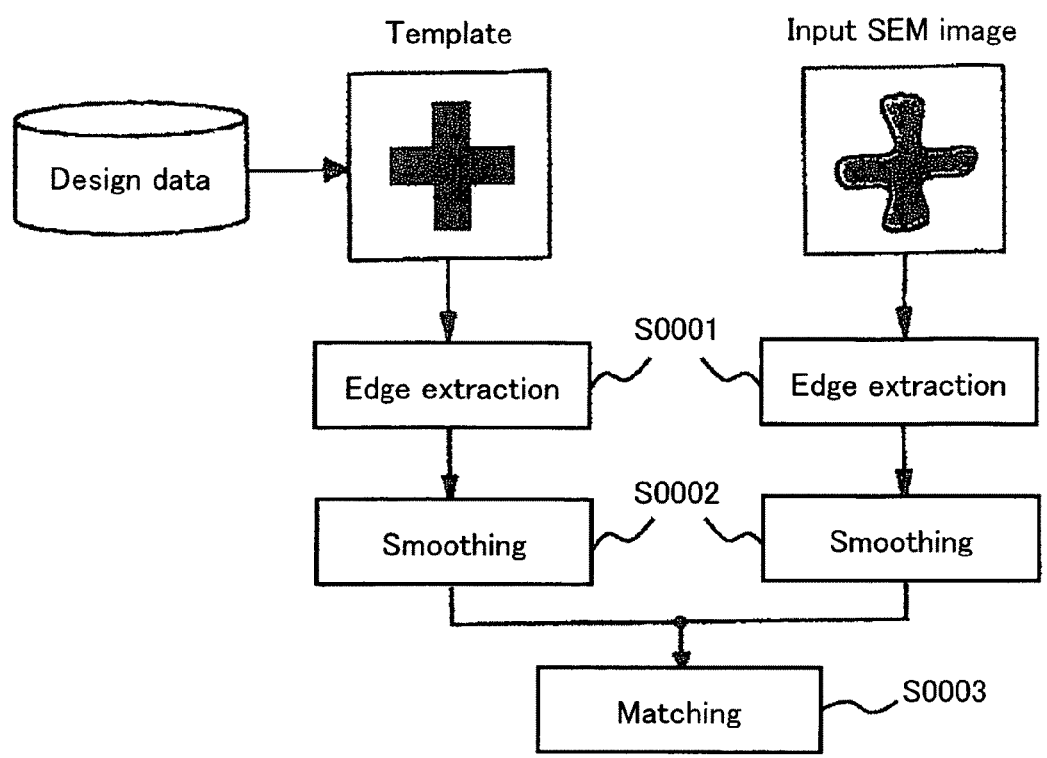
FIG. 2 explains an example of pattern matching.

The data management device or any of the other devices also has a pattern matching capability between graphic data based on the design data and an SEM image produced by any of the scanning electron microscopes. For example, the pattern matching involves, as shown in FIG. 2, extracting an edge (S0001) from not only a template extracted from the design data but also an SEM image, smoothing the edges (S0002) to complement the geometry difference therebetween, and matching (S0003) between the smoothed edges. The matching may, of course, alternatively be performed between vector data.

A description will now be made of a method, a device, and a system suitable for evaluation of a mask used in semiconductor manufacturing processes. The present embodiment is described primarily with reference to mask measurement, but evaluation may be performed on a pattern on a semiconductor wafer.

An approach used in mask inspection performed in semiconductor manufacturing processes has involved measuring one-dimensional dimensions of a mask with a measuring scanning electron microscope. However, recent miniaturization has posed a problem of insufficient quality of a finished product due to geometry dependence of the mask itself, which is affected by the miniaturization, and there is a need for two-dimensional geometry evaluation.

In a mask manufacturing process, dry etching-related variation primarily poses a problem of in-plate variation (such as in-mask plane distribution and local variation in pattern density). Variation of this type affects the transfer of edge geometry of a light-blocking film (chromium mask and shifter) because of the decrease in thickness of the light-blocking film on the mask. Further, mask topography has been required as the information necessary for light exposure simulation. In the present embodiment, taper of an edge portion of a pattern is evaluated as one type of the topography information.

The following description relates to a method for precisely developing a contour on a mask from an image acquired with a CD-SEM using a precise edge detection method, as well as to an inspection device using the method. The description particularly relates to extraction of geometry abnormality and defective geometry of a periphery pattern including a mask pattern by contouring the geometry of the mask, and to generation of the contour in a pattern design data format. Contouring allows use of evaluation and verification technologies used in a variety of design processes, which in turn allows precise yield management and improvement in the semiconductor manufacturing processes. Further, in the present embodiment, a description will be made of an approach that allows inspection of a taper angle by using an edge detection threshold method for extracting a contour to identify the taper angle.

Moreover, expressing a contour in the form of hierarchically structured design data allows the expression to be related to the design data structure of the circuit; verification results of the contour, pass or fail, to be directly reflected in the design data for checking, prediction, and modification; design failure to be more quickly corrected; and the yield to be improved.

[Embodiments]

A description will be made of a method for evaluating taper (inclination) of an edge portion of a mask by using a plurality of contours obtained from an SEM image.

Figure 3:
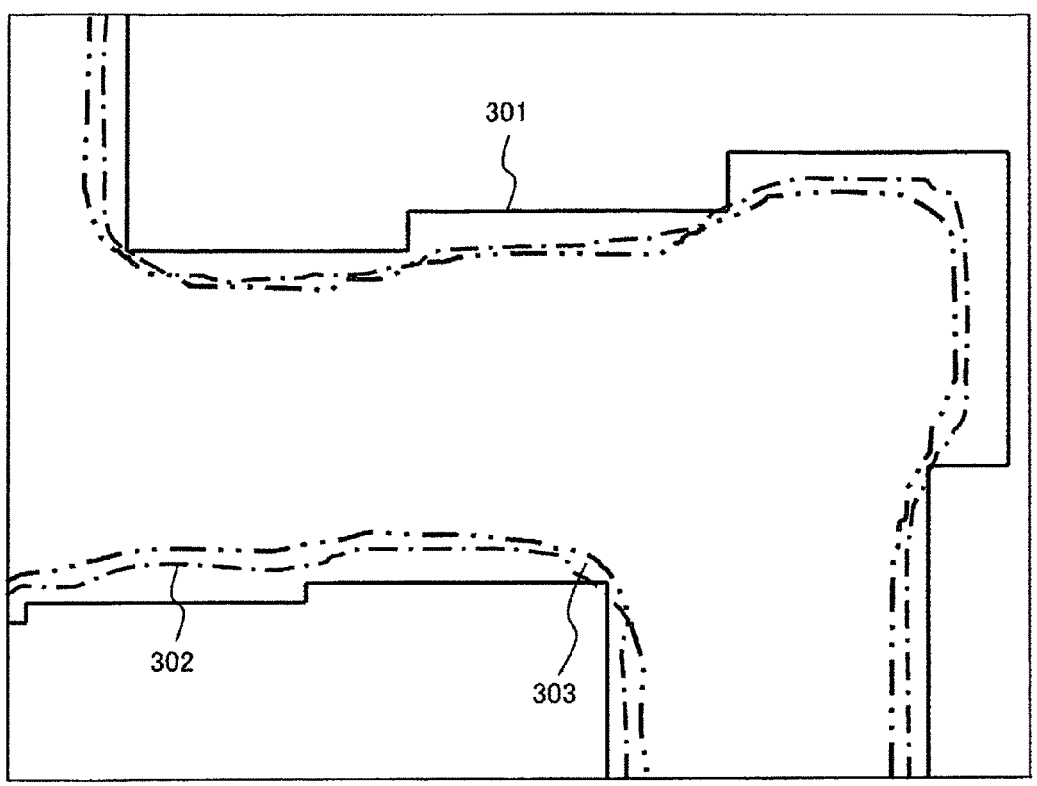
FIG. 3 explains an example of contouring an edge portion based on an SEM image of a certain portion of a mask.

FIG. 3 explains an example of contouring an edge portion based on an SEM image of a certain portion of a mask. The solid line represents design data in a predetermined format (a GDS file, for example) and is expressed in the form of a diagram (hereinafter sometimes referred to as a design data diagram 301). The dash-dot line represents a contoured SEM edge obtained based on a predetermined method (hereinafter sometimes referred to as a first contour 302). The dash-dot-dot line represents another contoured SEM edge obtained based on the predetermined method (hereinafter sometimes referred to as a second contour 303).

The first contour 302 and the second contour 303 change their positions in accordance with the geometry of the edge portions at the upper and lower surface levels of the mask. For example, evaluating the distance between the first contour 302 and the second contour 303 allows the taper of the mask edge to be evaluated. The details will be described below with reference to the drawings.

Figure 4:
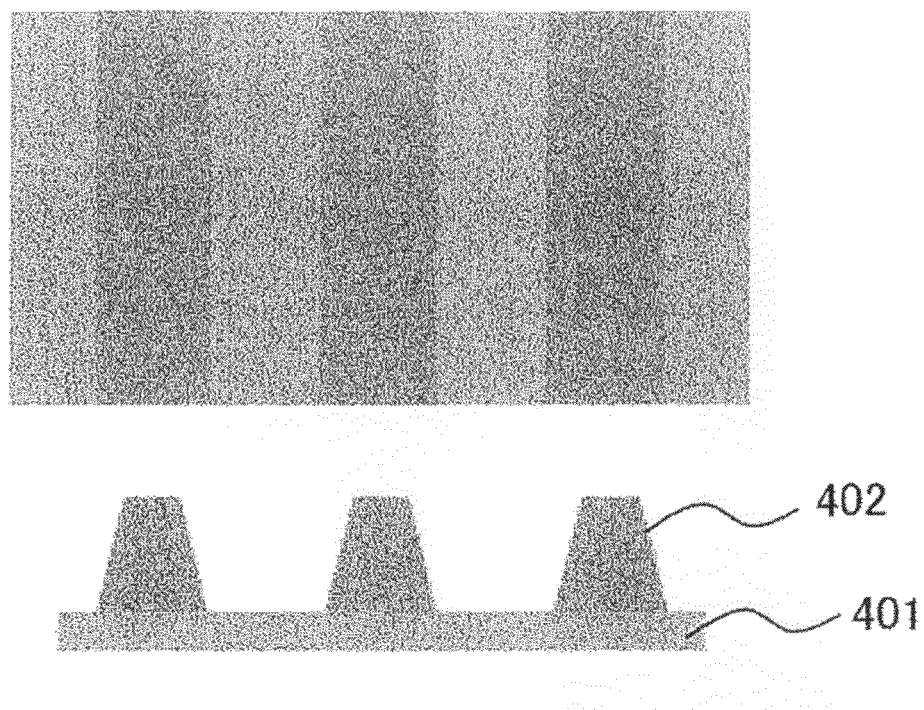
FIG. 4 includes a plan view and a cross-sectional view of a mask.
Figure 5:
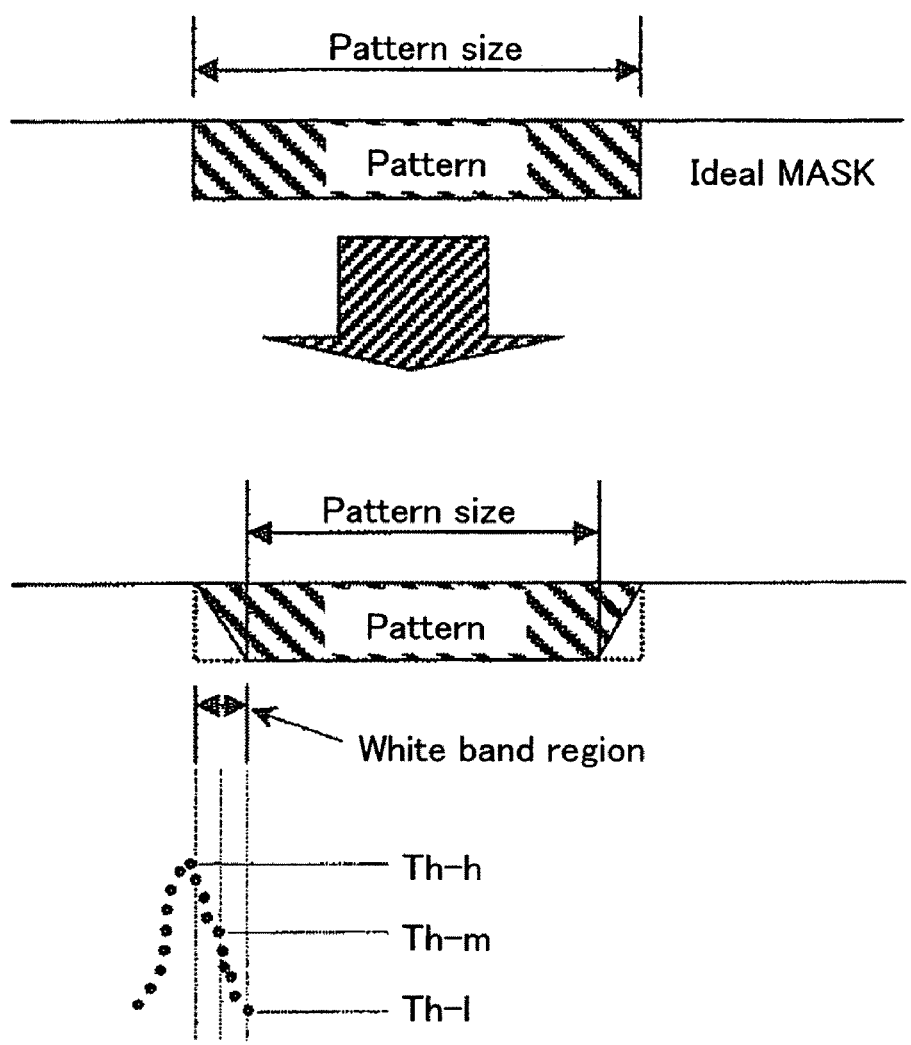
FIG. 5 explains an example of a tapered pattern.

FIG. 4 includes a plan view and a cross-sectional view of the mask. A photomask is an original plate used in semiconductor device manufacturing processes, includes a glass substrate 401 on which a circuit pattern 402 is drawn, and is used to optically, in general, transfer the pattern onto a resist applied onto a semiconductor wafer or any other suitable substrate. When the pattern is tapered, the light from an optical exposure device will not appropriately irradiate a desired portion on the semiconductor wafer, resulting in improper light exposure in some cases. Therefore, when the circuit pattern 402 is unexpectedly tapered, the transfer will be inaccurate and a proper pattern is difficult to form in some cases. More specifically, as illustrated in FIG. 5, an ideal cross-sectional shape of the circuit pattern 402 is a rectangle. However, in practice, dry etching-related variation that occurs in the mask manufacturing process or other factors may result in a tapered portion. Since the presence of such a tapered portion greatly affects the quality of the pattern produced by the transfer, proper evaluation of the taper geometry and feedback based on the evaluation to the mask manufacturing process are particularly important to improve yield and other manufacturing parameters.

Figure 6:
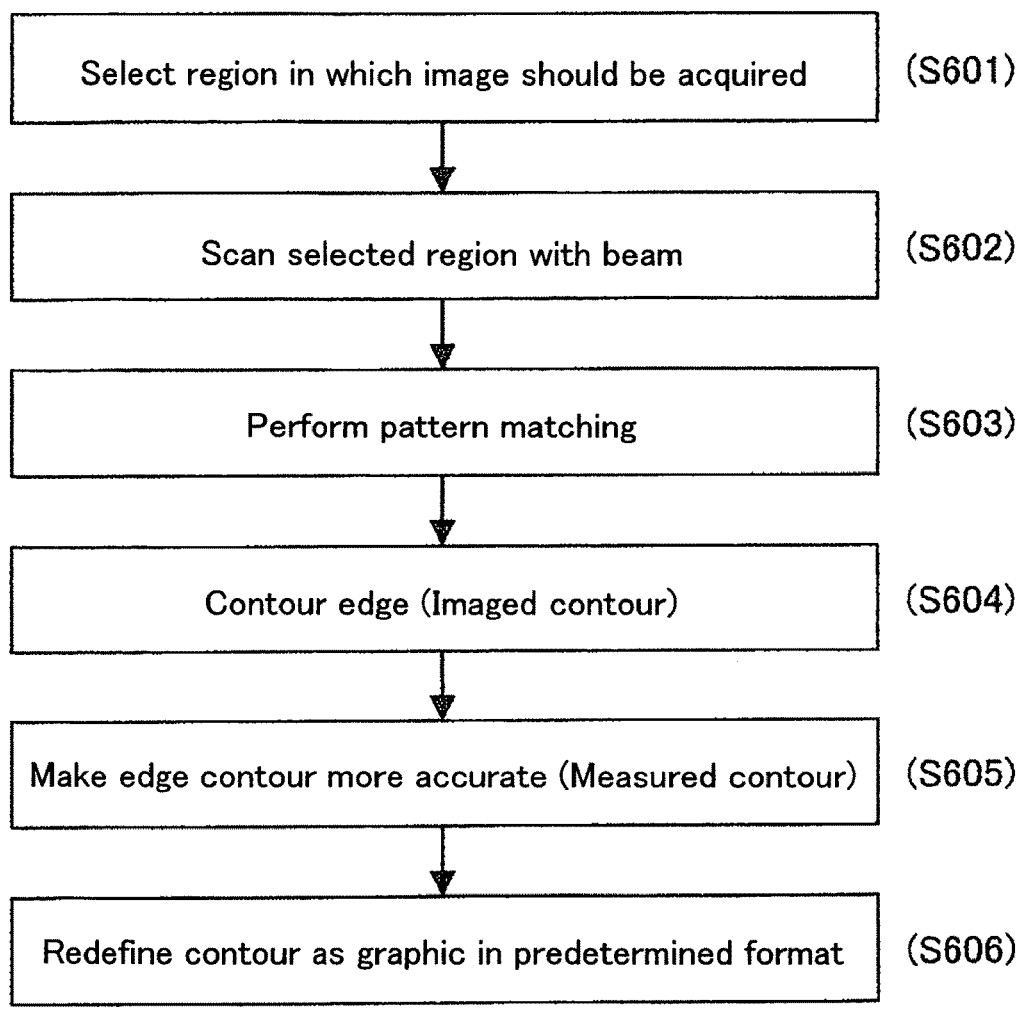
FIG. 6 is a flowchart explaining the steps from SEM image acquisition to taper measurement.

A method for properly evaluating the taper of a mask will be described below with reference to a flowchart. FIG. 6 is a flowchart explaining the steps from SEM image acquisition to taper measurement. First, a region in which an image should be acquired is selected based on design data (S601). Then, to acquire an SEM image in the region of a sample that has been specified based on the selection, a sample stage and a deflector for deflecting the electron beam to a desired location, which are provided in the scanning electron microscope, are used to position the electron beam in the specified region on the sample, and the electron beam scans the region to acquire an image (S602).

An edge is extracted from the acquired image, and pattern matching is performed between the edge and a design data-based contour (S603). In the present embodiment, the pattern matching is performed in accordance with the steps described in FIG. 2, but the pattern matching is not necessarily performed this way. The pattern matching may be performed in accordance with another matching method as long as matching accuracy can be ensured.

The SEM edge is then contoured (S604). In the contouring, the brightness distribution of the white band of the SEM edge is recognized as a waveform, as shown in FIG. 5, and points showing high brightness (or points extracted by setting a predetermined threshold) are connected so that a contour is extracted.

To make the thus extracted contour (hereinafter referred to as an imaged contour) more accurate, length measurement boxes are set in such a way that a plurality of arbitrary locations on the imaged contour are scanned with the electron beam, for example, in the direction perpendicular to the imaged contour (in the direction in which the scan path is perpendicular to the imaged contour), and then the electron beam scan is performed accordingly. Since each of the length measurement boxes is properly oriented with respect to the imaged contour, a waveform formed based on the scanning accurately represents the brightness distribution of the edge portion of the actual pattern. Points showing a predetermined threshold on the thus formed waveform are connected so that a new contour (hereinafter referred to as a measured contour) is formed (S605).

Figure 7:
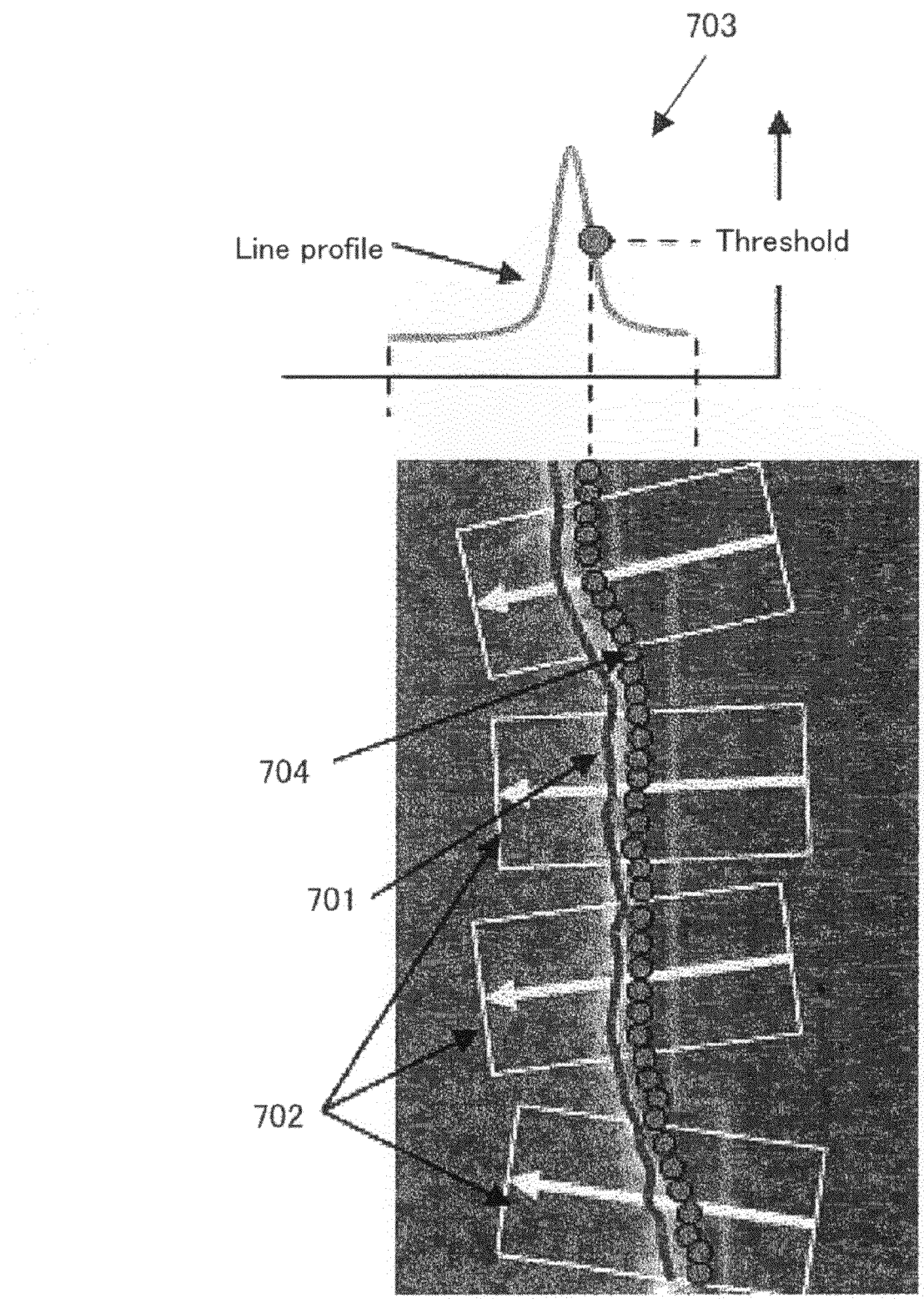
FIG. 7 explains a principle of forming a measured contour.

The measured contour is formed based on the principle illustrated in FIG. 7. Length measurement boxes 702 are set in such a way that the electron beam scan direction is perpendicular to an imaged contour 701 formed as described above, and waveforms 703 are formed based on the electrons detected during the electron beam scan. For the waveforms 703, a measured contour 704 is formed by connecting points in the image that show a predetermined threshold.

The thus formed measured contour is redefined as a graphic in a predetermined format (GDS format, for example) and stored on a storage medium (S606).

Figure 8:
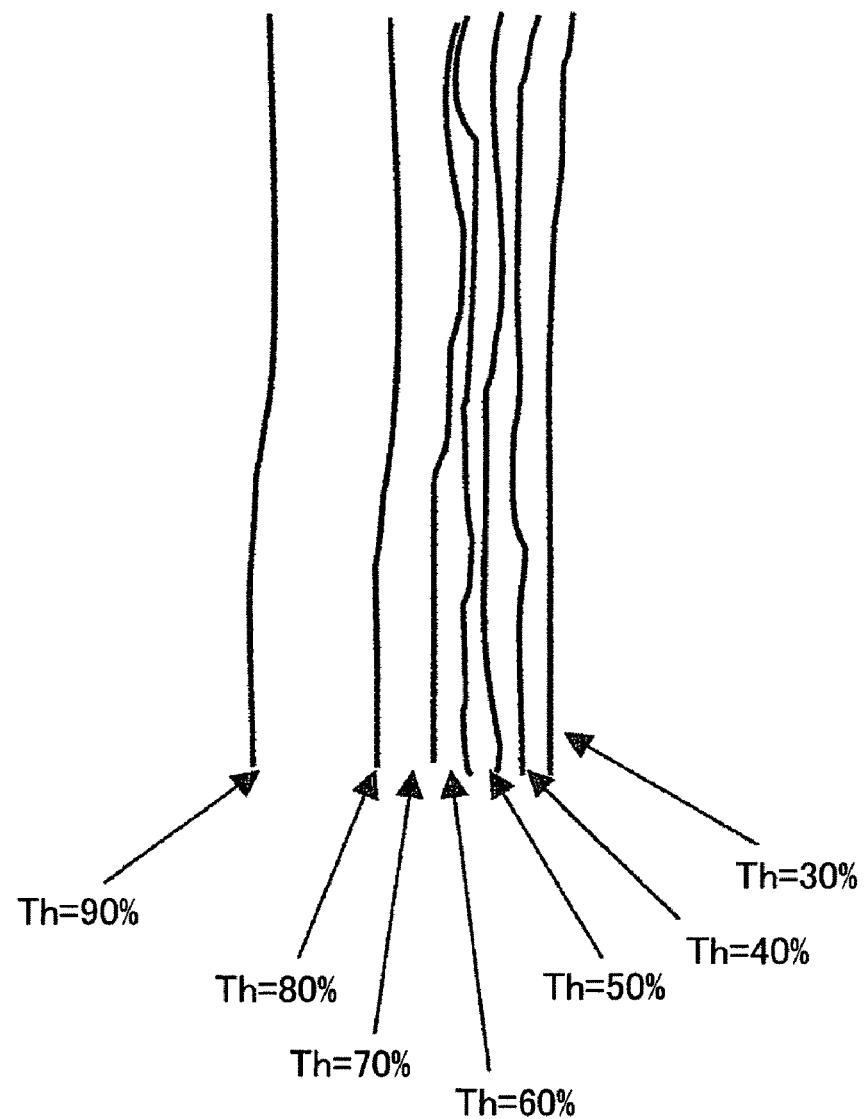
FIG. 8 shows an example of extracting a plurality of contours.

A more specific description will be made of an example in which a plurality of contours are formed to properly evaluate a photomask. FIG. 8 shows an example in which a plurality of thresholds are set on each of the waveforms obtained by scanning length measurement boxes to extract a plurality of measured contours. In the example in FIG. 8, provided that the peak of each of the waveforms is 100%, contours are extracted by incrementing the threshold by 10% in the range from 30% to 90%. Assuming that 90% threshold corresponds to the edge portion at the upper surface level of the pattern and 30% threshold corresponds to the edge portion at the lower surface level of the pattern, a dimension for evaluating the taper angle of the edge can be measured by measuring the distance between the two edge portions.

Figure 9:
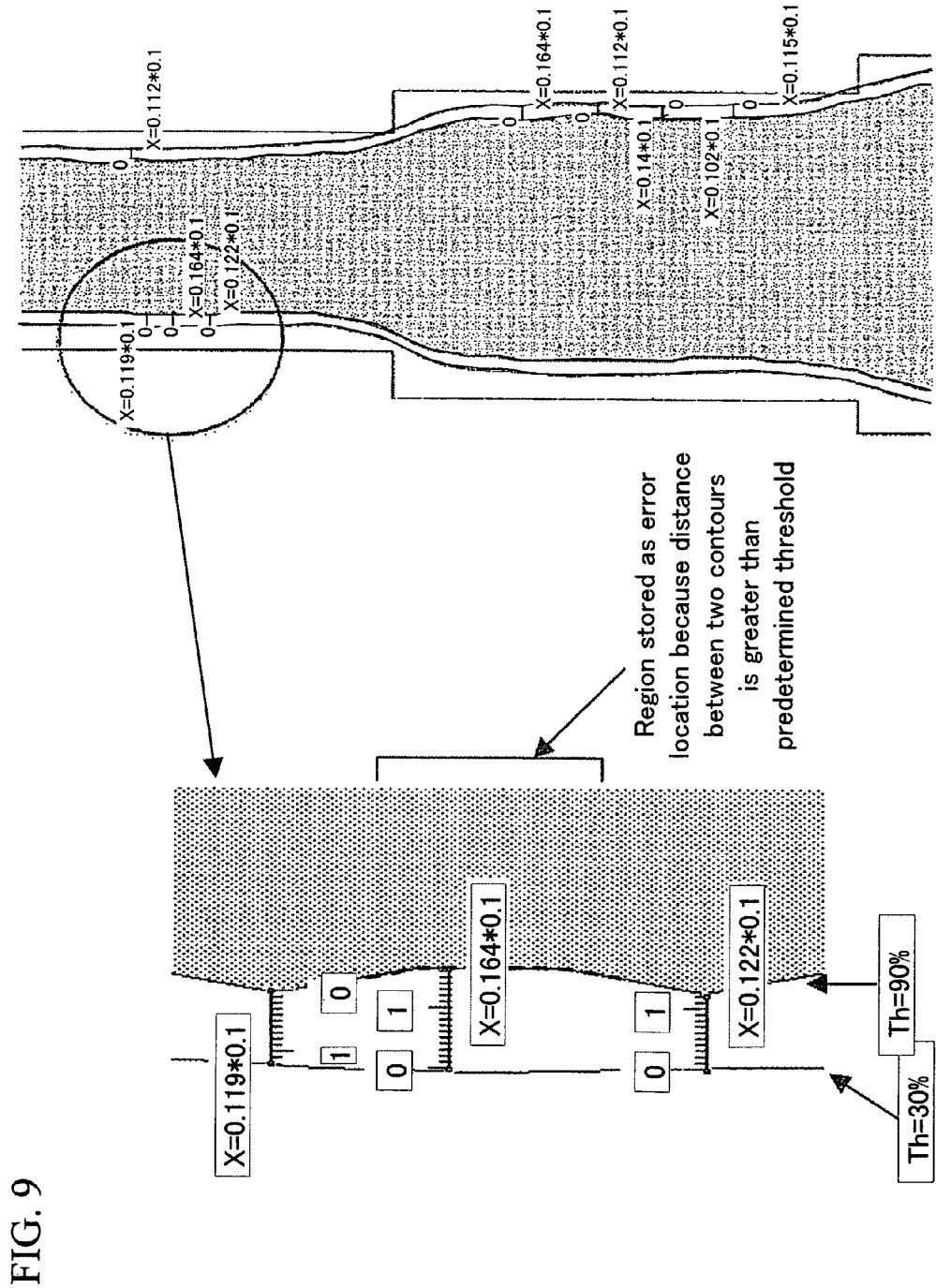
FIG. 9 explains an example of measuring the dimension between contours.

FIG. 9 explains an example of measuring the dimension between the contour obtained by using 30% threshold and the contour obtained by using 90% threshold. FIG. 9 explains an example in which the dimension between the two contours is measured and an error is issued when the dimension between them is greater than a predetermined value. A large value of the dimension means a large taper angle (the angle between the edge portion and the surface of the glass substrate approaches zero). It is therefore possible to properly evaluate light exposure precision and yield provided by using the mask in question by issuing an error signal or storing the fact that an error signal has been issued on a storage medium when the dimension is greater than the predetermined value.

Even when the taper angle is large, the lower surface (the surface on the light source side in the optical exposure device) may be formed ideally in size, and the large taper angle may not greatly affect the light exposure conditions. In view of the above case, in the present embodiment, the distance between the 30%-threshold contour and the design data is measured as well, and an error may be selectively issued not only when the distance between the 30%-threshold contour and the design data is greater than a predetermined value but also when the distance between the 30%-threshold contour and the 90%-threshold contour is greater than a predetermined value, that is, when an AND operation between the above two criteria is true.

The plurality of contours described above may alternatively be determined based on a differential waveform obtained by differentiating a waveform. In this case, second or higher order derivative may be used to determine a plurality of peaks, and the peaks may be used to extract contours.

Figure 10:
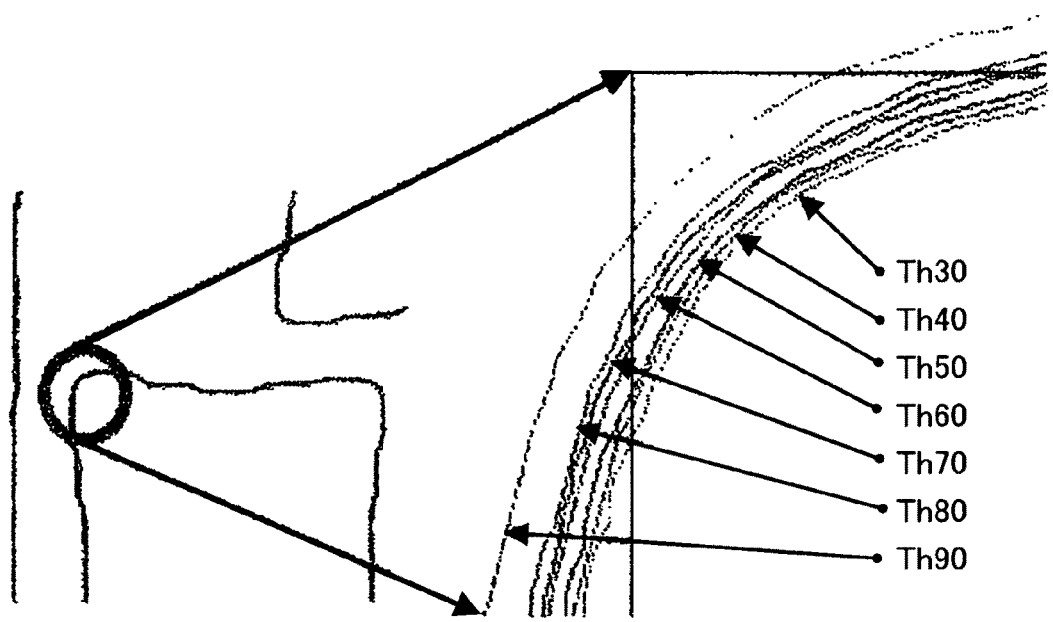
FIG. 10 explains an example of displaying a plurality of contours all at once obtained by using different thresholds.

The degree of taper may be objectively evaluated by displaying a plurality of contours all at once obtained by using different thresholds, as shown in FIG. 10.

Further, in-plane variation in taper angle can be objectively evaluated by displaying the degree of the taper angle in a predetermined area of a mask (or the entire area of a mask) in the form of in-plane distribution. For example, when a large number of patterns of the same geometry are arranged, a pattern that should have the same geometry as the others may not be formed into the same geometry due to an adjacent pattern, and the taper angle of only that pattern close to the adjacent pattern becomes larger than those of the other patterns in some cases. Measuring the distance, for example, between the 30%-threshold contour and the 90%-threshold contour for each pattern or for each region including a plurality of patterns and displaying the distribution of the measurement results allow evaluation of in-plane variation. Alternatively, the distribution of a dimension or an evaluation value thereof for each portion of a pattern or the distribution of an evaluation value for each pattern may be displayed. Still alternatively, instead of the dimension between contours, the area of the two-dimensional region present between the contours may be determined, and an evaluation value may be calculated based on the area.

When the area is determined, classifying the area measurement results to show which area measurement result corresponds to which side of the pattern allows evaluation of the cause-and-effect relationship between the amount of taper for each side and the cause of taper generation.

According to the display form and the data management method described above, the following measures can be taken for a location, for example, showing a taper angle greater than or equal to a predetermined value: feedback to design data, for example, increasing the distance to an adjacent pattern; repairing the mask; and handling a location to be exposed to light through a portion showing a taper angle having at least a predetermined value as a hot spot (portion prone to be defective) in volume production.

For example, in the example shown in FIG. 1, when the SEM 2 is dedicated to photomask and reticle measurement and the SEM 3 is dedicated to wafer measurement, the information on the taper angle acquired with the SEM 2 can be used to automatically determine a location to be measured with the SEM 3.

As described above, measuring different target objects, a wafer and a photomask, with different SEMs and using the result measured with one of the devices to modify the measurement conditions of the other one of the measuring devices allow a recipe describing measurement conditions of the other one of the measuring devices to be created in accordance with the factors that probably affect the quality of semiconductor devices.

Figure 11:
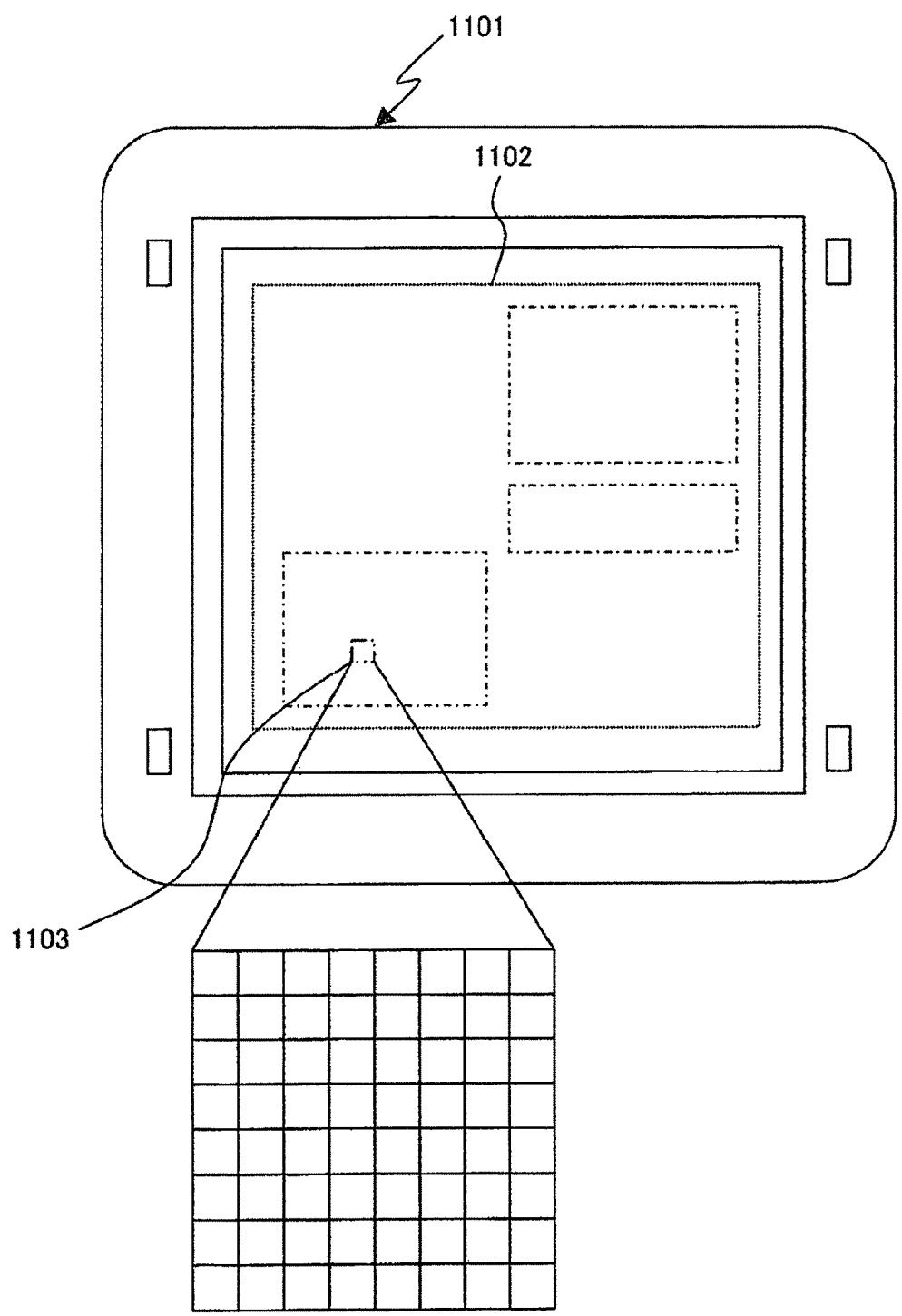
FIG. 11 explains an example of displaying the in-plane distribution of an evaluation value indicative of the degree of the taper angle of a mask.

FIG. 11 explains an example of displaying the in-plane distribution of an evaluation value indicative of the degree of the taper angle of a mask (the dimension between two contours in the present embodiment). For example, the dimension between two contours or an evaluation value equivalent thereto obtained for each predetermined region in a portion 1103 in a pattern region 1102 of a photomask 1101 is displayed in association with the predetermined region. In the present embodiment, matrix regions obtained by partitioning the portion 1103 in the pattern region are displayed, and the dimension or equivalent value obtained for each of the plurality of regions or for each pattern is displayed. The dimensions or equivalent values are not necessarily displayed in a matrix, but may be displayed in any form as long as the distribution of the dimensions or equivalent values can be understood.

Instead of displaying raw dimensions, the raw dimensions may be classified into predetermined dimension ranges and displayed, for example, in different colors. Further, the dimension can be any of a representative value, average, area, and a variety of other parameters of each region. The calculation and the measured dimension classification described above may be carried out in the data management device or in the controller provided in each of the SEMs.

In addition to the evaluation methods described above, to objectively evaluate how much the distance to an adjacent pattern or any other relevant parameter affects the taper, the distribution of an evaluation value indicative of the degree of the taper angle (in the embodiment, for example, the dimension between the 30%-threshold contour and the 90%-threshold contour, or the dimension classified according to size and assigned a value in accordance with the classification) may be compared with the distribution of an evaluation value of the distance between a pattern to be evaluated and a pattern considered to affect the taper of the pattern to be evaluated (the distance between a pattern to be evaluated and its nearest-neighbor pattern, for example), and the comparison result may be displayed.

In addition to the distance-related evaluation value, evaluation values of other parameters that can contribute to taper angle formation (such as manufacturing conditions of the mask and the size of an adjacent pattern) may be compared with the evaluation value based on the distance between contours, and the comparison results may be displayed.

Comparison and display may be carried out, for example, by preparing a plurality of matrices described with reference to FIG. 11 and displaying the distributions one at a time or all at once. Alternatively, displaying tabulated results allows evaluation of the cause-and-effect relationship between an evaluation value indicative of the degree of a plurality of taper angles and the cause for the taper angle formation in the pattern for which the taper angles have been evaluated.

The operator can visually judge how much the distance determined in the design stage between a pattern to be evaluated and a pattern in proximity thereto affects the taper formation by extracting the distance to the pattern in proximity to the pattern to be evaluated from design data, comparing the distance with an evaluation value of the taper angle, and displaying the comparison result, for example, as illustrated in FIG. 14. In this example, comparing the pattern number 53 with the pattern number 56, one can see that the result for the pattern number 56 shows that a large taper has been formed. According to the design data, the distance between the No. 56 pattern and an adjacent pattern is smaller than the distance between the No. 53 pattern and an adjacent pattern. One can therefore speculate that the distance to the adjacent pattern may somehow affect the taper. The dimension between patterns acquired based on an SEM image may be displayed instead of the design data. In this case, however, since high magnification observation of a pattern to be evaluated sometimes causes an adjacent pattern to be out of the field of view (FOV) of the SEM image, the distance is desirably extracted from the design data.

Further, in the present embodiment, in which the dimension between two contours is measured, a wrong measurement direction makes it difficult to properly evaluate the taper angle. When two contours are parallel to each other, the dimension measurement may be carried out, for example, in the direction perpendicular to the two contours, whereas when the two contours are not parallel to each other, proper measurement cannot disadvantageously be carried out unless the dimension measurement direction is set in accordance with a certain reference.

To address this problem, in the present embodiment, the measurement direction is set to be perpendicular to the outer contour (corresponding to the lower side of the pattern). The evaluation of the taper angle is evaluation of how much the upper side of the pattern has narrowed with respect to the lower side of the pattern (the light source side in the light exposure device). Based on the intent of the measurement, the contour that corresponds to the lower side of the pattern, which is the reference, is used as the reference for determining the measurement direction in the present embodiment. The measurement direction can be variously changed in accordance with the purpose of the measurement. For example, the angle between two contours and a straight line that intersects the contours and defines the dimension measurement direction can be the same for the two contours, or the measurement direction may be set with reference to a design data-based line segment, with reference to which the pattern is formed on the mask (the measurement direction may be set in the direction perpendicular to the design data-based line segment, for example). Further, the measurement may be carried out based on a new waveform obtained by performing another electron beam scan in such a way that the electron beam scan line direction coincides with the thus determined direction. Alternatively, the taper angle may be evaluated by determining the area between contours per predetermined length.

Further, as described above, a taper angle of a photomask pattern may variously affect a pattern produced by the transfer depending on the quality of the outer contour. For example, the influence of a taper angle on a pattern produced by light exposure differs between a case where the outer contour (corresponding to the surface positioned on the light source side during light exposure) is formed in complete accordance with design data and a case where the formed outer contour deviates from the design data.

Figure 13:
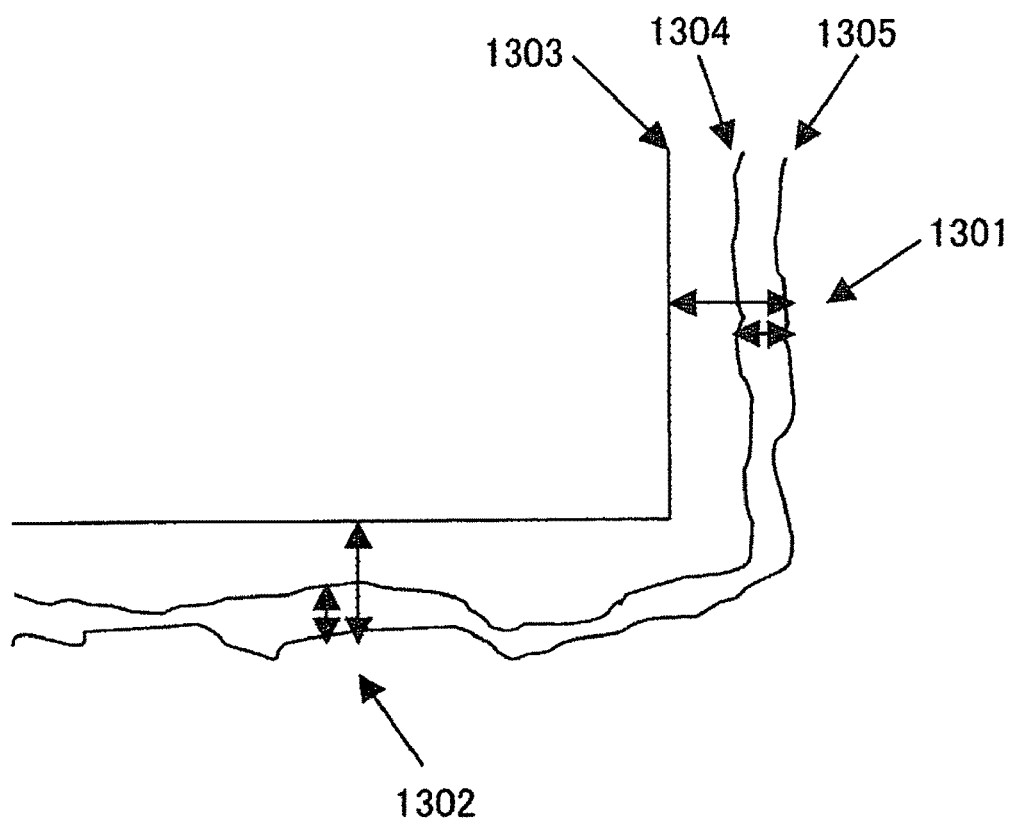
FIG. 13 explains an example of simultaneously displaying an EPE measurement result and an inter-contour measurement result.

To properly evaluate such a state, it is conceivable to carry out measurement, display, and data management that allow comparison of the dimension between a design data-based line segment of a photomask pattern and the contour corresponding thereto (hereinafter sometimes referred to as an edge placement error (EPE)) with the dimension between outer and inner contours. For example, as illustrated in FIG. 13, when desired measurement points 1301 and 1302 are provided, the dimension between the design data-based line segment 1303 and the outer contour 1304 as well as the dimension between the outer contour 1304 and the inner contour 1305 are measured. The measurement results are tabulated and displayed, for example, as illustrated in FIG. 14. Such a display form allows visual evaluation of the taper angle according to the degree of discrepancy between the design data and the mask pattern.

Further, the EPE measurement results and the inter-contour measurement results are converted into coefficients, and the hot spot probability may be judged based on the multiplication of the two types of coefficients. For example, EPE measurement results ranging from 0 to 0.5 nm are converted into a coefficient a1; EPE measurement results ranging from 0.5 to 1.0 nm are converted into a coefficient a2; and so forth. Similarly, inter-contour dimensions ranging from 0 to 0.5 nm are converted into a coefficient b1; inter-contour dimensions ranging from 0.5 to 1.0 nm are converted into a coefficient b2; and so forth. Multiplying the coefficient a by the coefficient b for each portion of a pattern or for each region in which a pattern is formed allows the hot spot probability of the pattern to be evaluated by using the same reference. The hot spot probability may, of course, be judged based on the multiplication of the raw dimensions.

Further, displaying the multiplication results in the form of a table as shown in FIG. 14, or displaying the multiplication results in the form of distribution as shown in FIG. 11 allows visual judgment of the evaluation results. Moreover, classifying the multiplication results into predetermined value ranges, identifying them by color or any other suitable means, and displaying them allow easier visual judgment.

Figure 12:
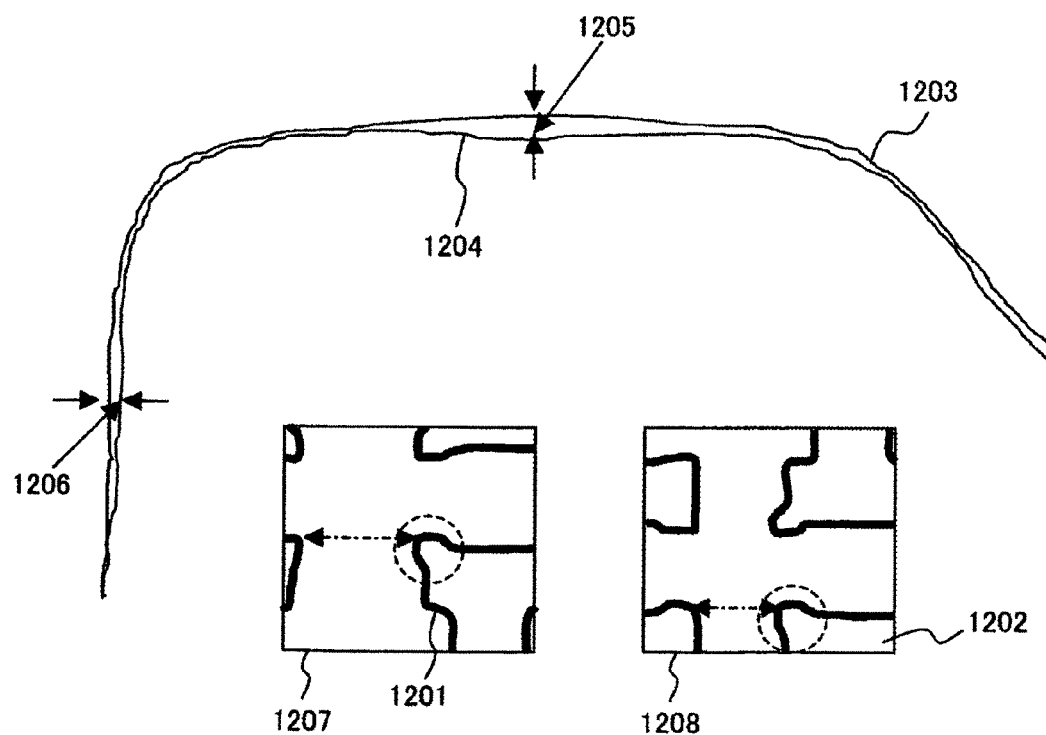
FIG. 12 explains an example of evaluating taper for each portion of a pattern.

Next, in a case where a plurality of patterns of the same geometry are present in a mask plate of a photomask, a description will be made, with reference to FIG. 12, of a method for analyzing a state in which the geometry of part of the mask changes, for example, due to an adjacent pattern by determining the difference among the plurality of patterns. FIG. 12 explains an example of detecting the difference between contours of the same geometry. SEM images 1207 and 1208 illustrated in FIG. 12 are obtained by imaging patterns of the same geometry provided in different locations.

OPC (Optical Proximity Correction) patterns 1201 and 1202 of the same geometry at the different locations are selected from the two SEM images, and contours 1203 and 1204 of the patterns are extracted. Superimposing the contours 1203 and 1204 on each other and detecting the difference between them allow the difference in quality between the actual geometries of the mask patterns of the same nominal geometry in the mask plate. Such evaluation allows objective evaluation of how an adjacent pattern and other factors affect taper.

While in the above example, the difference between the same portions of patterns of the same geometry at different locations is detected, the evaluation is not necessarily carried out this way. For example, the difference between the same portions described above may be evaluated based on the comparison of EPE measurement results between the two same portions. In the example shown in FIG. 12, EPE measurement may be carried out on the same locations of the pattern No. 54 and the pattern No. 36 to measure EPE1 and EPE2, and then the difference between the two measurements (EPE1–EPE2) may be calculated.

Further, by calculating statistics for the thus determined difference information for each portion of the pattern and for each orientation of the pattern for which the difference information has been extracted (upward, downward, rightward, or leftward orientation of the pattern in an image, for example), comparing the statistics calculation results for each portion of the pattern and for each orientation of the pattern for which the difference information has been extracted, and displaying the comparison results, the difference in quality depending on the orientation of the pattern and depending on a portion in the pattern can be evaluated. Further, by comparing the relationship with an adjacent pattern (such as the distance between a reference pattern and the adjacent pattern, orientation, the type of the adjacent pattern, and/or other necessary conditions) with the difference information described above and displaying the comparison results, it is possible to objectively evaluate how much the presence of the adjacent pattern affects the taper angle, deformation, and other parameters of the reference pattern.

A description will be made of an example of MEEF (Mask Error Enhancement Factor) analysis based on photomask contour extraction. MEEF stands for a mask error enhancement factor. A mask error (an error that occurs during manufacture) may be enhanced and transferred to a wafer in some cases. The MEEF analysis is carried out to evaluate the degree of the enhancement.

MEEF is typically defined as "line width error on wafer/line width error on mask." For example, the line width error on a mask is defined as the taper described above, and the line width error on a wafer is defined as the decrease in width of a pattern from a design value. It is possible to judge how much the taper of the mask contributes to the deformation of the pattern produced by actual light exposure.

Explanation Of Reference Numerals

1 . . . data management device
2, 3, 4 SEM
5, 6, 7 controller
8, 9, 10 communication line

What is claimed is:

1. A pattern measuring method comprising:
scanning a sample with a charged particle beam to form image data based on charged particles emitted from the sample;
contouring a pattern edge contained in the image data; and
using an imaged contour to measure a pattern formed on the sample, wherein:
the contouring includes, with respect to a band-shaped portion that is in the image data and corresponds to the pattern edge and from which the imaged contour is extracted, forming a first measured contour along positions within the band-shaped portion showing first brightness, and forming a second measured contour along positions within the band-shaped portion showing second brightness, and the measuring includes measuring a dimension between the two measured contours.

2. The pattern measuring method according to claim 1, wherein information on the dimension between the two measured contours is displayed in a tabular form or in an in-plane distribution form.

3. The pattern measuring method according to claim 1, wherein each of the measured contours is formed based on a waveform representing the brightness distribution of the band-shaped portion that is in the image data and corresponds to the pattern edge and from which the imaged contour is extracted, the distribution being along a direction traversing the band-shaped portion.

4. The pattern measuring method according to claim 3, wherein at least two thresholds are set on the brightness distribution waveform, and the first and second measured contours are formed based on the plurality of thresholds.

5. A pattern measuring device comprising an image processing unit that uses image data formed based on charged particles emitted from a sample to measure a pattern formed on the sample, wherein the pattern measuring device, with respect to a band-shaped portion that is in the image data and corresponds to a pattern edge and from which an imaged contour is extracted, forms a first measured contour along positions within the band-shaped portion showing first brightness, forms a second measured contour along positions within the band-shaped portion showing second brightness, and measures a dimension between the two measured contours.

6. The pattern measuring device according to claim 5, wherein the image processing unit displays information on the dimension between the two measured contours in a tabular form or in an in-plane distribution form.

7. The pattern measuring device according to claim 5, wherein the image processing unit forms each of the measured contours based on a waveform representing the brightness distribution of the band-shaped portion that is in the image data and corresponds to the pattern edge and from which the imaged contour is extracted, the distribution being along a direction traversing the band-shaped portion.

8. The pattern measuring device according to claim 7, wherein the image processing unit sets at least two thresholds on the brightness distribution waveform and forms the first and second measured contours based on the plurality of thresholds.

9. A measuring system comprising:

a charged particle beam device that irradiates a sample with a charged particle beam to form image data based on charged particles obtained in response to the irradiation; and a measuring device that is connected to the charged particle beam device via a communication medium and measures a pattern formed on the sample based on the image data, wherein the measuring device, with respect to a band-shaped portion that is in the image data and corresponds to a pattern edge and from which an imaged contour is extracted, forms a first measured contour along positions within the band-shaped portion showing first brightness, forms a second measured contour along positions within the band-shaped portion showing second brightness, and measures a dimension between the two measured contours for evaluation of inclination of the pattern edge.

* * * * *